US009491072B2

(12) United States Patent
Raghunathan et al.

(10) Patent No.: US 9,491,072 B2
(45) Date of Patent: Nov. 8, 2016

(54) CLOUD SERVICES LOAD TESTING AND ANALYSIS

(71) Applicant: ORACLE INTERNATIONAL CORPORATION, Redwood Shores, CA (US)

(72) Inventors: Kavitha Raghunathan, Saratoga, CA (US); John Masterson, Navan (IE); Nick Balch, High Wycombe (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 417 days.

(21) Appl. No.: 13/937,344

(22) Filed: Jul. 9, 2013

(65) Prior Publication Data

US 2015/0019706 A1    Jan. 15, 2015

(51) Int. Cl.
G06F 15/173    (2006.01)
H04L 12/26    (2006.01)
G06F 11/34    (2006.01)

(52) U.S. Cl.
CPC ......... *H04L 43/067* (2013.01); *G06F 11/3414* (2013.01); *H04L 43/04* (2013.01); *G06F 11/3466* (2013.01); *G06F 2201/875* (2013.01)

(58) Field of Classification Search
None
See application file for complete search history.

(56) References Cited

U.S. PATENT DOCUMENTS

| 6,016,394 A | 1/2000 | Walker |
| 6,185,625 B1 | 2/2001 | Tso et al. |
| 6,477,483 B1 * | 11/2002 | Scarlat ............... G06F 11/3414 702/186 |
| 6,738,811 B1 | 5/2004 | Liang |
| 6,973,489 B1 | 12/2005 | Levy |
| 7,177,866 B2 | 2/2007 | Holenstein et al. |
| 7,290,003 B1 | 10/2007 | Tong |
| 7,548,898 B1 | 6/2009 | Tarenskeen et al. |

(Continued)

FOREIGN PATENT DOCUMENTS

| CN | 105308577 A | 2/2016 |
| CN | 105324756 A | 2/2016 |

(Continued)

OTHER PUBLICATIONS

U.S. Appl. No. 13/937,970, Non-Final Office Action mailed on May 5, 2015, 17 pages.

(Continued)

*Primary Examiner* — Thomas Dailey
(74) *Attorney, Agent, or Firm* — Kilpatrick Townsend & Stockton LLP

(57) ABSTRACT

Embodiments of the invention provide systems and methods for providing services related to managing computer systems. More specifically, embodiments of the present invention provide for providing load testing services to remote computer systems. Generally speaking, such a service can allow a customer to capture and replay realistic workloads from production to test systems. The service can help the customer evaluate the impact of change on their system performance (e.g., upgrades, patches, application changes, schema changes, impact of adding more users, hardware changes, etc.) with a real-life workload captured from production and replayed on comparable test system restored to a captured "point in time." More specifically, the load testing service can setup and capture workloads from production systems and re-execute them with high fidelity on test copies of production databases which have the changes implemented.

17 Claims, 8 Drawing Sheets

(56) References Cited

U.S. PATENT DOCUMENTS

| | | |
|---|---|---|
| 7,580,862 B1 | 8/2009 | Montelo et al. |
| 7,693,983 B1 | 4/2010 | Gupta et al. |
| 8,150,811 B1 | 4/2012 | Tarenskeen et al. |
| 8,606,894 B1 | 12/2013 | Fremont et al. |
| 8,639,989 B1 | 1/2014 | Sorenson, III et al. |
| 8,924,353 B1 | 12/2014 | Patwardhan et al. |
| 8,943,032 B1 | 1/2015 | Xu et al. |
| 9,098,364 B2 | 8/2015 | Davis |
| 2001/0029502 A1 | 10/2001 | Oeda |
| 2002/0002578 A1 | 1/2002 | Yamashita |
| 2002/0019826 A1 | 2/2002 | Tan |
| 2002/0147645 A1 | 10/2002 | Alao et al. |
| 2002/0194329 A1 | 12/2002 | Alling |
| 2002/0198984 A1 | 12/2002 | Goldstein et al. |
| 2003/0066049 A1 | 4/2003 | Atwood et al. |
| 2003/0069903 A1 | 4/2003 | Gupta et al. |
| 2003/0192028 A1 | 10/2003 | Gusler et al. |
| 2004/0098425 A1 | 5/2004 | Wiss et al. |
| 2004/0178261 A1 | 9/2004 | Potonniee et al. |
| 2004/0181790 A1 | 9/2004 | Herrick |
| 2004/0260875 A1 | 12/2004 | Murotani et al. |
| 2005/0021567 A1 | 1/2005 | Holenstein et al. |
| 2005/0055446 A1 | 3/2005 | Chidambaran et al. |
| 2005/0102318 A1* | 5/2005 | Odhner ............... G06F 11/3414 |
| 2005/0204241 A1 | 9/2005 | Tamakoshi |
| 2006/0059253 A1 | 3/2006 | Goodman et al. |
| 2006/0112247 A1 | 5/2006 | Ramany et al. |
| 2006/0156086 A1* | 7/2006 | Flynn ..................... H04L 12/66 714/12 |
| 2006/0173875 A1 | 8/2006 | Stefaniak |
| 2006/0179171 A1 | 8/2006 | Stefaniak et al. |
| 2006/0179431 A1 | 8/2006 | Devanathan et al. |
| 2006/0235899 A1 | 10/2006 | Tucker |
| 2006/0282825 A1 | 12/2006 | Taylor |
| 2007/0150488 A1 | 6/2007 | Barsness et al. |
| 2007/0239774 A1 | 10/2007 | Bodily et al. |
| 2007/0299892 A1 | 12/2007 | Nakahara |
| 2008/0313595 A1 | 12/2008 | Boulineau et al. |
| 2009/0070733 A1 | 3/2009 | Huang et al. |
| 2009/0113399 A1 | 4/2009 | Tzoref et al. |
| 2009/0187413 A1 | 7/2009 | Abels et al. |
| 2009/0210857 A1 | 8/2009 | Martineau |
| 2009/0238078 A1 | 9/2009 | Robinson et al. |
| 2009/0313311 A1 | 12/2009 | Hoffmann et al. |
| 2010/0005097 A1* | 1/2010 | Liang .................. G06F 11/3414 707/E17.032 |
| 2010/0191884 A1 | 7/2010 | Holenstein et al. |
| 2010/0192156 A1 | 7/2010 | Hollingsworth |
| 2010/0198799 A1 | 8/2010 | Krishnan et al. |
| 2011/0093436 A1 | 4/2011 | Zha et al. |
| 2011/0161933 A1 | 6/2011 | Hudson |
| 2012/0017112 A1* | 1/2012 | Broda ................... G06F 9/5083 714/4.4 |
| 2012/0041933 A1 | 2/2012 | Driesen |
| 2012/0150642 A1 | 6/2012 | Kandanala et al. |
| 2012/0254435 A1 | 10/2012 | Zhaofu et al. |
| 2012/0265726 A1 | 10/2012 | Padmanabhan et al. |
| 2012/0284360 A1 | 11/2012 | Bense et al. |
| 2012/0297016 A1* | 11/2012 | Iyer ....................... G06F 9/5072 709/217 |
| 2012/0311128 A1* | 12/2012 | Pechanec ........... G06F 11/3414 709/224 |
| 2013/0067298 A1* | 3/2013 | Li ....................... G06F 11/3688 714/799 |
| 2013/0085742 A1 | 4/2013 | Barker et al. |
| 2013/0085989 A1 | 4/2013 | Nayyar et al. |
| 2013/0152050 A1 | 6/2013 | Chang et al. |
| 2013/0173547 A1 | 7/2013 | Cline et al. |
| 2013/0311968 A1 | 11/2013 | Sharma |
| 2014/0019961 A1 | 1/2014 | Neuse et al. |
| 2014/0075033 A1 | 3/2014 | Doering et al. |
| 2014/0089809 A1 | 3/2014 | Levy et al. |
| 2014/0109053 A1 | 4/2014 | Vasudevan et al. |
| 2014/0172782 A1 | 6/2014 | Schuenzel et al. |
| 2014/0195636 A1 | 7/2014 | Karve et al. |
| 2014/0279890 A1 | 9/2014 | Srinivasan et al. |
| 2014/0337429 A1 | 11/2014 | Asenjo et al. |
| 2014/0344439 A1 | 11/2014 | Kempf et al. |
| 2015/0019195 A1 | 1/2015 | Davis |
| 2015/0019197 A1 | 1/2015 | Higginson et al. |
| 2015/0019478 A1 | 1/2015 | Buehne et al. |
| 2015/0019479 A1 | 1/2015 | Buehne et al. |
| 2015/0019487 A1 | 1/2015 | Buehne et al. |
| 2015/0019488 A1 | 1/2015 | Higginson et al. |
| 2015/0019564 A1 | 1/2015 | Higginson et al. |
| 2015/0019700 A1 | 1/2015 | Masterson et al. |
| 2015/0019707 A1 | 1/2015 | Raghunathan et al. |
| 2015/0020059 A1 | 1/2015 | Davis |

FOREIGN PATENT DOCUMENTS

| | | |
|---|---|---|
| CN | 105324769 A | 2/2016 |
| CN | 105359102 A | 2/2016 |
| CN | 105359146 A | 2/2016 |
| CN | 105359147 A | 2/2016 |
| CN | 105393250 A | 3/2016 |
| CN | 105556515 A | 5/2016 |
| EP | 2418591 | 2/2012 |
| GB | 2468742 | 9/2010 |
| JP | 2006277153 | 10/2006 |
| WO | 9952047 | 10/1999 |
| WO | 0153949 | 7/2001 |
| WO | 2015/005991 | 1/2015 |
| WO | 2015/005994 | 1/2015 |
| WO | 2015/006124 | 1/2015 |
| WO | 2015/006129 | 1/2015 |
| WO | 2015/006132 | 1/2015 |
| WO | 2015/006137 | 1/2015 |
| WO | 2015/006138 | 1/2015 |
| WO | 2015/006308 | 1/2015 |
| WO | 2015/006358 | 1/2015 |

OTHER PUBLICATIONS

U.S. Appl. No. 13/937,977, Final Office Action mailed on Feb. 26, 2015, 30 pages.
U.S. Appl. No. 13/938,066, Notice of Allowance mailed on Apr. 29, 2015, 15 pages.
U.S. Appl. No. 13/937,977, Non-Final Office Action mailed on Aug. 12, 2014, 28 pages.
Charles, Bug Serverity vs. Priority, Quality Intelligence Blog, Retrieved on Aug. 4, 2014, from http://quality-intelligence.blogspot.com/2010/08/bug-severity-vs-priority.html, Aug. 22, 2010, 6 pages.
Das et al., Albatross: Lightweight elasticity in shared storage databases for the cloud using live data migration, 37th International Conference on Very Large Data Bases, Proceedings of the VLDB Endowment, vol. 4, No. 8, Retrieved from the Internet:URL:http://www.cs.ucsb.eduj-sudiptojpapers/albatross.pdf, Aug. 29, 2011, 12 pages.
International Application No. PCT/US2014/040486, International Search Report and Written Opinion mailed on Sep. 29, 2014, 11 pages.
International Application No. PCT/US2014/040692, International Search Report and Written Opinion mailed on Oct. 8, 2014, 8 pages.
International Application No. PCT/US2014/045247, International Search Report and Written Opinion mailed on Sep. 3, 2014, 8 pages.
International Application No. PCT/US2014/045282, International Search Report and Written Opinion mailed on Sep. 18, 2014, 12 pages.
Chanchary et al., Data Migration: Connecting Databases in the Cloud, ICCIT 2012, Saudi Arabia, retrieved from the Internet: <URL:http://www.chinacloud.cnjupload/2012-03/12033108076850.pdf>, Jun. 28, 2012, pp. 450-455.
Leite et al., Migratool: Towards a Web-Based Spatial Database Migration Tool, IEEE Computer Society, Proceedings of the 16th International Workshop on Database and Expert Systems Applications, Aug. 22, 2005, pp. 480-484.
Tao et al., Intelligent database placement in cloud environment, Web Services (ICWS), 2012 IEEE 19th International Conference, IEEE Computer Society, Jun. 24, 2012, pp. 544-551.

(56) References Cited

OTHER PUBLICATIONS

U.S. Appl. No. 13/938,066, Non-Final Office Action mailed on Dec. 17, 2014.
International Application No. PCT/US2014/045226, International Search Report and Written Opinion mailed on Oct. 30, 2014, 10 pages.
International Application No. PCT/US2014/045240, International Search Report and Written Opinion mailed on Oct. 21, 2014, 10 pages.
International Application No. PCT/US2014/045289, International Search Report and Written Opinion mailed on Oct. 15, 2014, 9 pages.
International Application No. PCT/US2014/045721, International Search Report and Written Opinion mailed on Nov. 4, 2014, 12 pages.
International Application No. PCT/US2014/045804, International Search Report and Written Opinion mailed on Nov. 17, 2014, 12 pages.
U.S. Appl. No. 13/937,483, Non-Final Office Action mailed on Sep. 25, 2015, 13 pages.
U.S. Appl. No. 13/937,977, Non-Final Office Action mailed on Aug. 19, 2015, 34 pages.
U.S. Appl. No. 13/938,066, Corrected Notice of Allowability mailed on Jun. 2, 2015, 2 pages.
International Application No. PCT/US2014/040486, Written Opinion mailed on Jun. 17, 2015, 7 pages.
International Application No. PCT/US2014/040692, Written Opinion mailed on Jul. 16, 2015, 7 pages.
U.S. Appl. No. 13/937,868, Non-Final Office Action mailed on Nov. 4, 2015, 18 pages.
U.S. Appl. No. 13/937,545, Non-Final Office Action mailed on Nov. 10, 2015, 19 pages.
Baysal, et al., "A Bug You Like: A Framework for Automated Assignment of Bugs", 2009.
U.S. Appl. No. 13/937,970, Final Office Action mailed on Dec. 10, 2015, all pages.
U.S. Appl. No. 13/937,970, Non-Final Office Action mailed on May 12, 2016, all pages.
U.S. Appl. No. 13/937,486, Non-Final Office Action mailed on Jan. 11, 2016, all pages.
U.S. Appl. No. 13/937,868, Final Office Action mailed on Apr. 22, 2016, all pages.
U.S. Appl. No. 13/937,483, Final Office Action mailed on Feb. 26, 2016, all pages.
U.S. Appl. No. 13/937,483, Advisory Office Action mailed on May 12, 2016, all pages.
U.S. Appl. No. 13/937,545, Final Office Action mailed on May 13, 2016, all pages.
International Preliminary Report on Patentability of PCT/US2014/045247, mailed on Jan. 21, 2016, all pages.
International Preliminary Report on Patentability of PCT/US2014/045804, mailed on Jan. 21, 2016, all pages.
International Preliminary Report on Patentability of PCT/US2014/045721, mailed on Jan. 21, 2016, all pages.
International Preliminary Report on Patentability of PCT/US2014/045282, mailed on Jan. 21, 2016, all pages.
International Preliminary Report on Patentability of PCT/US2014/045289, mailed on Jan. 21, 2016, all pages.
International Preliminary Report on Patentability of PCT/US2014/045240, mailed on Jan. 21, 2016, all pages.
Notification of Transmittal of The International Preliminary Report on Patentability of PCT/US2014/040486, mailed on Oct. 1, 2015, all pages.
Notification of Transmittal of The International Preliminary Report on Patentability of PCT/US2014/040692, mailed on Oct. 8, 2015, all pages.
International Preliminary Report on Patentability of PCT/US2014/045226, mailed on Jan. 21, 2016, all pages.
To, et al. "Best Practices for Database Consolidation on Exadata Database Machine", Oracle White Paper, Oracle, 2011, 29 pages.
Vengurlekar, et al. "Best Practices for Database Consolidation in Private Clouds", Oracle White Paper, Oracle, Mar. 2012, 20 pages.
U.S. Appl. No. 13/937,483, Non-Final Office Action, mailed on Aug. 12, 2016, 13 pages.
U.S. Appl. No. 13/937,486, Final Office Action, mailed on Jul. 28, 2016, 18 pages.
U.S. Appl. No. 13/937,885 Non-Final Office Action, mailed on Aug. 18, 2016, 30 pages.
U.S. Appl. No. 13/937,977, Corrected Notice of Allowability, mailed on Jul. 18, 2016, 2 pages.
U.S. Appl. No. 13/938,061, Non-Final Office Action, mailed on Aug. 18, 2016, 27 pages.
U.S. Appl. No. 13/937,885, Non-Final Office Action, mailed on Aug. 18, 2016, 30 pages.
U.S. Appl. No. 13/937,988, Non-Final Office Action mailed Sep. 1, 2016, 10 pages.

* cited by examiner

CLOUD SERVICES LOAD TESTING AND ANALYSIS

CROSS-REFERENCES TO RELATED APPLICATIONS

U.S. patent application Ser. No. 13/937,977, filed Jul. 9, 2013, and entitled "METHOD AND SYSTEM FOR REDUCING INSTABILITY WHEN UPGRADING SOFTWARE;"

U.S. patent application Ser. No. 13/938,061, filed Jul. 9, 2013, and entitled "CONSOLIDATION PLANNING SERVICES FOR SYSTEMS MIGRATION;"

U.S. patent application Ser. No. 13/938,066, filed Jul. 9, 2013, and entitled "MIGRATION SERVICES FOR SYSTEMS;"

U.S. patent application Ser. No. 13/937,885, filed Jul. 9, 2013, and entitled "DATABASE MODELING AND ANALYSIS;"

U.S. patent application Ser. No. 13/937,868, filed Jul. 9, 2013, and entitled "AUTOMATED DATABASE MIGRATION ARCHITECTURE;"

U.S. patent application Ser. No. 13/937,483, filed Jul. 9, 2013, and entitled "CLOUD SERVICES PERFORMANCE TUNING AND BENCHMARKING;"

U.S. patent application Ser. No. 13/937,988, filed Jul. 9, 2013, and entitled "SOLUTION TO GENERATE A SCRIPTSET FOR AN AUTOMATED DATABASE MIGRATION;"

U.S. patent application Ser. No. 13/937,545, filed Jul. 9, 2013, and entitled "ONLINE DATABASE MIGRATION;"

U.S. patent application Ser. No. 13/937,486, filed Jul. 9, 2013, and entitled "DYNAMIC MIGRATION SCRIPT MANAGEMENT;"

U.S. patent application Ser. No. 13/937,970, filed Jul. 9, 2013 and entitled "ADVANCED CUSTOMER SUPPORT SERVICES—ADVANCED SUPPORT CLOUD PORTAL," of which the entire disclosure of each is incorporated herein by reference for all purposes.

BACKGROUND OF THE INVENTION

Embodiments of the present invention relate generally to methods and systems for providing services related to managing computer systems and more particularly to providing load testing services to remote computer systems.

Modern database systems are very complex, comprised of numerous components. Managing the systems, diagnosing problems, updating software, and installing new components may therefore be a very involved and complicated task. As a result, system administrator may spend considerable time determining problems, upgrading software, and installing new components. In many cases, specialists or specially trained technicians and administrators may be needed on site to perform the more complicated and specialized tasks.

The necessity to use specially trained technicians and administrators may increase costs and/or increase delays and uncertainty of maintaining and operating the systems. It may often take days or even weeks for a technician or administrator trained to be available to come to a specific site to upgrade software or diagnose a problem. The cost of travel, time, and time investment for the technician or administrator to understand the system and components before the work may begin may further add to the time delay and costs.

Hence, there is a need for improved methods and systems for providing services related to managing computer systems.

BRIEF SUMMARY OF THE INVENTION

Embodiments of the invention provide systems and methods for providing load testing services to remote computer systems. According to one embodiment, providing load testing services to one or more remote computer systems can comprise initiating by a service provider computer system one or more load testing services. Initiating the one or more load testing services can comprises providing by the service provider system access to the one or more load testing services through the portal, receiving by the service provider system through the portal a customer selection of at least one of the one or more load testing services and an indication of the one or more remote computer system as targets of the selected at least one of the one or more load testing services, and installing by the service provider system the gateway on the one or more remote computer systems indicated as targets if the gateway is not yet installed on the one or more remote computer systems indicated as targets.

Providing load testing services to one or more remote computer systems can further comprise capturing by the service provider system through a gateway a set of data related to performance of the one or more remote computer systems. Capturing the set of data related to performance of the one or more remote computers can comprise monitoring by the service provider system through the gateway the one or more remote computer systems indicated as targets for a period of time to identify periods of peak loads for the one or more remote computer systems indicated as targets within the period of time. Identifying periods of peak loads for the one or more remote computer systems indicated as targets within the period of time further can comprise providing by the service provider system through the portal an indication of the periods of peak loads for the one or more remote computer systems indicated as targets and receiving by the service provider system through the portal an indication of acceptance of the identified periods of peak loads for the one or more remote computer systems indicated as targets. The service provider system can capture through the gateway workloads and tuning set data at the identified periods of peak loads and can create a point-in-time clone of a set of production data of the one or more remote computer systems indicated as targets.

Providing load testing services to one or more remote computer systems can further comprise performing by the service provider computer system one or more tests on the captured set of data and providing by the service provider computer system through a portal a first set of one or more reports based on results of performing the one or more tests on the captured data. In some cases, performing one or more tests on the captured set of data can comprise executing one or more analysis tool on the captured tuning set data. In such cases, providing one or more reports based on results of performing the one or more tests on the captured data can comprise generating a report of results of executing the one or more analysis tools on the captured tuning set data and wherein the report includes one or more recommendations associated with the results. Additionally or alternatively, performing one or more tests on the captured set of data can comprise replaying the captured workloads on the point-in-time clone of the set of production data of the one or more remote computer systems indicated as targets. In such cases, providing one or more reports based on results of performing the one or more tests on the captured data can comprise generating a report of results of replaying the captured workloads on the point-in-time clone of the set of production data of the one or more remote computer systems indicated as targets and wherein the report includes one or more recommendations associated with the results. In some implementations, providing load testing services to one or more remote computer systems can further comprise repeating said capturing a set of data related to performance of the one or more remote computer systems and said performing one or more tests on the captured set of data, and providing through the portal a second set of one or more reports based on results of performing the one or more tests on the captured data after adjustments have been made to the one or more remote computer systems.

DETAILED DESCRIPTION OF THE INVENTION

Figure 1:
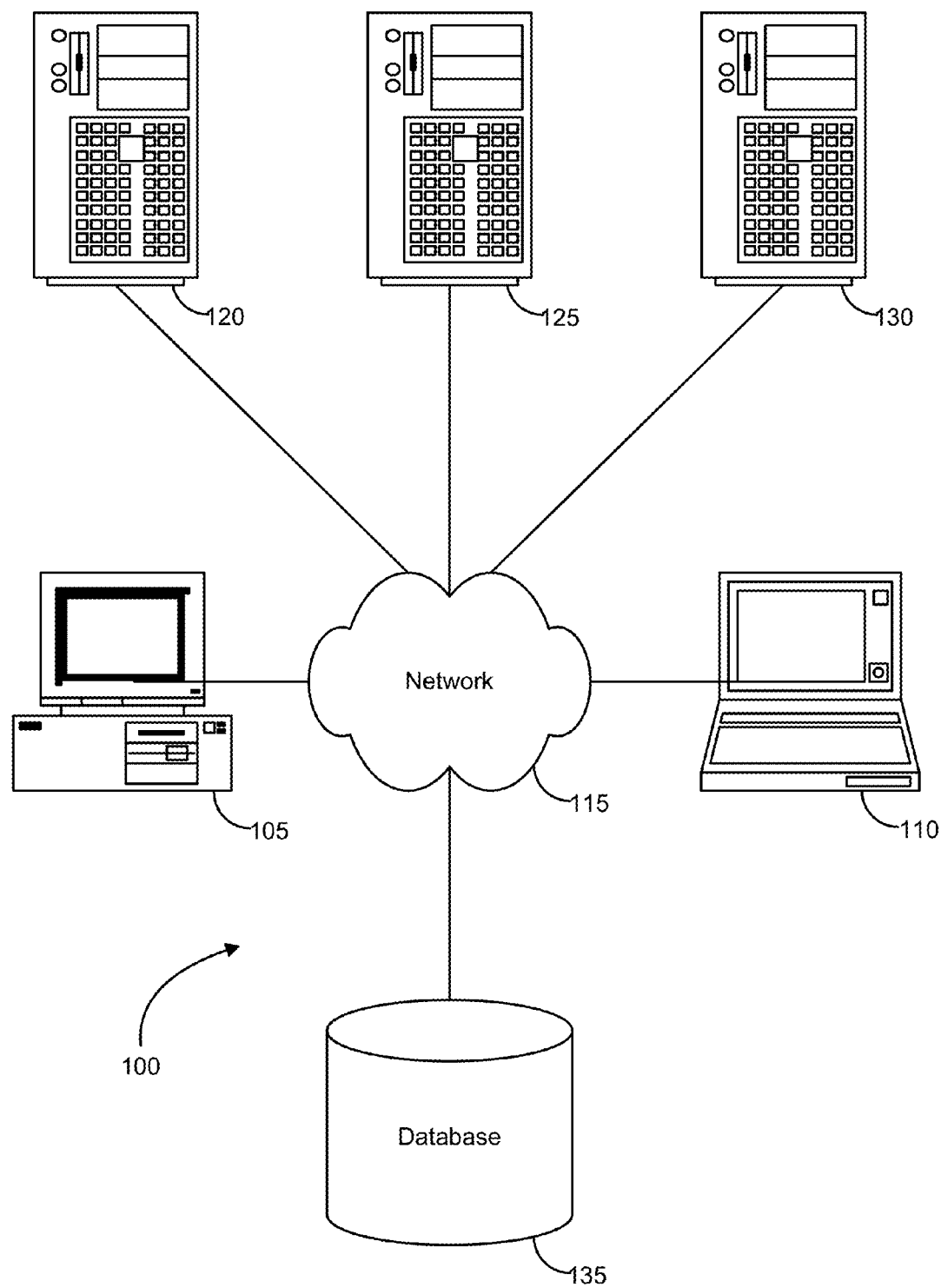
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing services related to managing computer systems. More specifically, embodiments of the present invention provide for providing load testing services to remote computer systems. Generally speaking, such a service can allow a customer to capture and replay realistic workloads from production to test systems. The service can help the customer evaluate the impact of change on their system performance (e.g., upgrades, patches, application changes, schema changes, impact of adding more users, hardware changes, etc.) with a real-life workload captured from production and replayed on comparable test system restored to a captured "point in time." More specifically, the load testing service can setup and capture workloads from production systems and re-execute them with high fidelity on test copies of production databases which have the changes implemented. According to one embodiment, the service can take into account concurrency and flow of the workload and can be a realistic depiction of the production workload on the test system. A report of finding with recommendations can be presented showing the impact of the changes on the workload. The customer using the service can then be given an opportunity to implement the recommendations, re-run the workload, and be given a report with pre and post change results. The customer may then be given the choice to buy additional captures/replays for the same database, perhaps at a reduced price. Charts, graphs, reports, and other results of the service as well as recommendations provided can be stored for future reference by the service and/or the customer. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
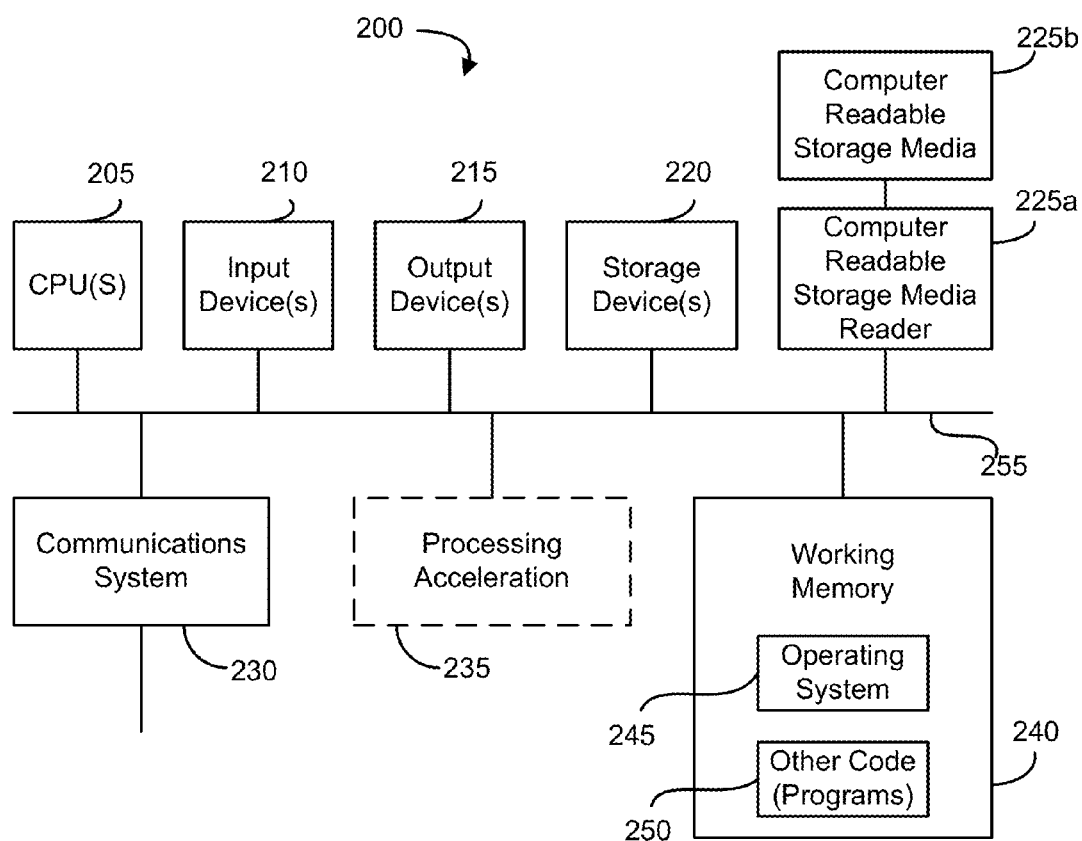
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

A database system, such as any of the systems described above, may require administration such as periodic maintenance, software upgrades, migration, service deployment, diagnostics, performance tuning, and/or other services. Some organizations and businesses that use database systems may employ system administrators or other personnel to perform some of these tasks. Some tasks may require special skills or knowledge outside the scope of a typical administrator and may require an outside expert or personnel to accomplish the tasks. In some cases, the administration tasks may be performed by an outside entity or engineer as a service to the organization or business.

Traditionally, services are provided based on multiple engagements with customer contacts, and creating a contract and service delivery plan tailored to the customer's needs. Service delivery itself is traditionally provided onsite and based on the specific knowledge and/or software the service engineer has access to and may differ from engineer to engineer.

Many of the administrative tasks and services associated with database systems may be simplified and streamlined with a platform architecture that supports remote administration, development, and deployment of services. A system may be configured to allow automation of tasks and services and the reuse of components. Such a system may be used to generate, store, deploy, execute, and track services through their complete life cycle. Services may be designed, made available for deployment, deployed to a customer, and monitored using the system.

According to one embodiment, such a system may include a remote portal from which customers, administrators, and service provider may monitor, deploy, and analyze services for a remote customer's target system. The administration may be performed and controlled remotely and at least in part automatically. Services may be controlled and deployed to the target system using the portal eliminating the need for an administrator to be local to the target system. Likewise, the portal can provide a rich set of tools for all customers and depends less on the individual skill and knowledge of the particular engineer performing service.

Such a system may facilitate performing services in at least a partially automated and remote manner and may result in a number of important benefits to the service provider and the customer. For example, the system may reduce the time to market for new services. A unified system which enables services to be built using common features/components may reduce the time to develop and test the new service. Automation and consistency may allow the service provider to create a standard pricing and contracting model that can be re-used for new services. Sales and contracting time for new services may be reduced due the simplified pricing model. A service provider may create a modular service portfolio and can deliver services discretely or as part of a solution. The system may reduce the cost of developing and delivering services by allowing service designers and developers to leverage common features. As developers create more automated services, this reduces/eliminates the need for manual input, thus reducing the cost of delivering a service. The system may also provide for an improvement in global service quality and consistency since services may be designed, developed and delivered through the platform in at least a partially automated manner. The system may also expand the market for services enabling services to be easily sold and delivered.

In embodiments, such a system may be used for the development and deployment of services including assessment services assessing infrastructure, business data, and/or transactions of the database system. The services may leverage analytics to identify key indicators, patterns and/or trends. Services may install, monitor and/or perform setup of new software and/or hardware. Services may install and implement gold images or perform migrations, upgrades, and consolidations. In addition services may include provisioning, cloning, backup and recovery, install, setup, test, monitoring, recovery and restore, metering, chargeback, testing, load testing, functional testing, performance management and tuning, and/or the like. In some embodiments, the services may leverage one service as a basis for other services.

Figure 3:
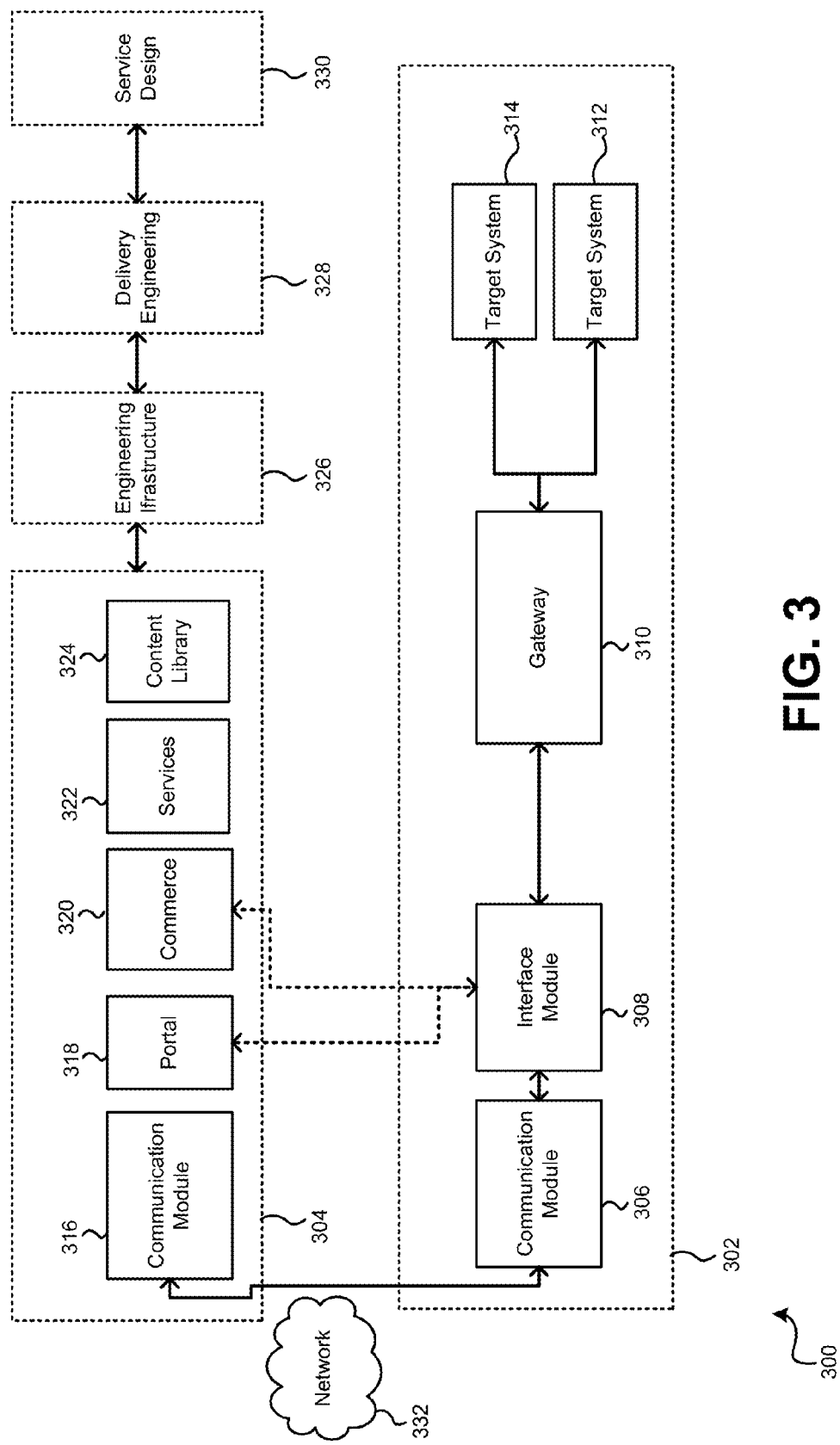
FIG. 3 is a block diagram illustrating, at a high-level, functional components of a system for delivering services according to one embodiment of the present invention.

FIG. 3 is a block diagram illustrating, at a high-level, functional components of a system for delivering services according to one embodiment of the present invention. Generally speaking, services may be designed, made available for deployment, deployed to a customer, and monitored using the system 300. The customer data center 302 may include one or more target systems 312, 314 that may be the target of the services provided by the system 300. The target systems may be servers, computers, rack systems, and the like that run or execute a database and/or other database software used by a customer. A target system may be a hardware or software entity that can have service delivered and may be a host, database, web logic service, and/or the like. In the customer data center 302, the target systems 312, 314 may be managed by an administrator local to the data center 302. The administrator may have physical access to the target systems 312, 314. The cloud system 300, may provide for the administration and other services of the target systems via a remote interface from a remote location. A gateway 310, located on the data center 302 provides remote access to the data center 302 and one or more target systems 312, 314. The gateway 310 may be a hardware or virtual software appliance installed at the customer data center. The gateway 310 connects to a production cloud 304 of a service provider via a secure connection using a communication module 306 over a network 332.

The gateway 310 may optionally have an interface module 308 allowing control of the interactions of gateway 310 to the production cloud 304 of the service provider.

Services may be generated and developed using a common service development framework of the system 300. The common service development framework may include a service design 330, delivery engineering 328, and engineering infrastructure 326 modules. The common service development framework may leverage common components that can be used throughout the delivery process (manual and/or automated), and may enable the efficient design, development, testing and release of a service. The common service development framework of the system 300 enables at least partial automation of the development of a service.

The system 300 enables delivery engineers to automate the service they are developing. In some embodiments, the development of services may be automated or simplified with the use of reusable components. For example, many of the same deployment, execution, and error handling function used in the services may be designed as reusable components. The components may be reused in many services allowing the design and coding of the service to be focused on the new core functionality of the service. Using the system 300, services may be designed and implemented in one or more central locations. A centralized service design and development system 300 enables a hierarchical and structured service design with reusable components and modules. The development of a service may be, at least in part, automated since a large portion of the components of a service may assembled from existing reusable components.

After the services are designed, developed, and tested, they may be stored at the production cloud 304. The production cloud 304 may include a library of services 322 and a content library 324. The services and content may be deployed from the production cloud 304 to one or more target systems 312, 314 at a customer data center 302. The deployment, monitoring, and the like of services may be arranged with interaction from the portal 318 and commerce module 320 at the production cloud 304 and the gateway 310 and an interface module 308 at the customer data center 302 via the communication modules 306, 316. The design, deployment and monitoring of the service may be performed remotely from production cloud without the need of an administrator or engineer at the customer's data center 302. The portal 318 of the system 300 may provide for remote control and administration of services, control of deployment, and analysis of results.

The system 300 of FIG. 3 may be used to develop, deploy and manage, services for the customer data center 302 and target systems 312, 314. A gateway 310 has access to the target systems 312, 314. Services, in the forms of software, scripts, functions, and the like, may be downloaded from the production cloud 304. The commerce module 320 and the portal for the production cloud 304 provide an interface, selection tools, monitoring tools, for selecting the services, and monitoring the services to be deployed in the customer data center 302. An administrator at the customer data center 302 may view, select, and monitor the services using the portal 318 and commerce module 320. The customer may access the portal 318 and commerce module 320 using interface module 308 at the customer data center 302. The interface module may have a direct or an indirect access to the portal 318 and the commerce module via the communication module 306. For example, using the system 300, a service may be selected using the commerce module 320.

The commerce module 320 may be accessed using the interface module 308. Once a service is selected and configured for the target systems 312, 314, the service may be deployed from the production cloud 304 to the customer data center 302 via the gateway 310. The gateway may deploy the service on to the target systems. The gateway 310 may be used to gather data statistics, monitor services, and receive system information about the customer data center and the target systems. The data may be processed, analyzed, and transmitted to the production cloud. The data may be used to suggest or deploy services to the customer, present statistics or metrics of the customer's target servers using the portal 318. Additional details of various elements of system 300 including the portal 318 and gateway 310 are described in the Related Applicants entitled "Advanced Customer Support Services—Advanced Support Cloud Portal" referenced above and incorporated herein.

As noted above, such a system 300 can facilitate performing services in at least a partially automated and remote manner. For example, a service provider can implement such a system to provide to a customer services including but not limited to performing periodic maintenance, providing software upgrades, performing system migrations, supporting service deployments, diagnostics, performance tuning, and/or other services. Some such services are described in greater detail in the Related Applications referenced above and incorporated herein. According to one embodiment, these services can additionally or alternatively include a load testing service. Generally speaking, such a service can allow a customer to capture and replay realistic workloads from production to test systems. The service can help the customer evaluate the impact of change on their system performance (e.g., upgrades, patches, application changes, schema changes, impact of adding more users, hardware changes, etc.) with a real-life workload captured from production and replayed on comparable test system restored to a captured "point in time." More specifically, the load testing service can setup and capture workloads from production systems and re-execute them with high fidelity on test copies of production databases which have the changes implemented. According to one embodiment, the service can take into account concurrency and flow of the workload and can be a realistic depiction of the production workload on the test system. A report of finding with recommendations can be presented showing the impact of the changes on the workload. The customer using the service can then be given an opportunity to implement the recommendations, re-run the workload, and be given a report with pre and post change results. The customer may then be given the choice to buy additional captures/replays for the same database, perhaps at a reduced price. Charts, graphs, reports, and other results of the service as well as recommendations provided can be stored for future reference by the service and/or the customer.

Figure 4:
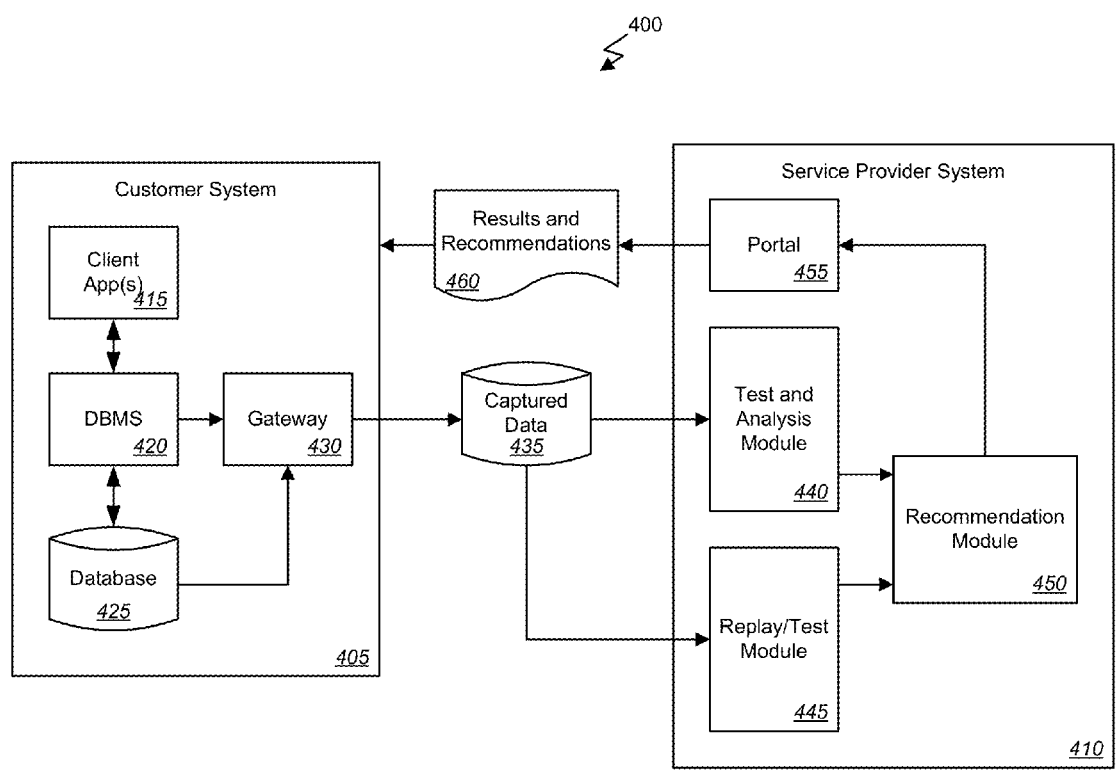
FIG. 4 is a block diagram illustrating, conceptually, a system and process for performing load testing according to one embodiment of the present invention.

FIG. 4 is a block diagram illustrating, conceptually, a system and process for performing load testing according to one embodiment of the present invention. In this example, the system 400 includes a customer system 405 and a service provider system 410. As can be understood by one skilled in the art, the customer system can execute any number of client applications 415 which use a set of application data stored in a database 425 accessible through a database management system 420.

The service provider system 410 may execute a portal module 455 as described above. Generally speaking, the portal can provide an interface (not shown here) such as a set of web pages through which an administrator, manager, or other user of the customer system 405 may interact with the service provider system 410, for example, to request the load testing and/or other services. Through this interface, the user of the customer system 405 can identify and/or define the system to be tested, tests to be performed, etc. In response, the service provider system 410 can initiate the gateway 430 or, if not yet installed on the customer system 405, the service provider system 410 may install and initiate the gateway 430 on the customer system 405.

Once initiated, the gateway 430 can collect a set of data and provide this collected data 435 to the service provider system 405. For example, the captured data 435 can include a set of SQL statements extracted or copied from the applications 415 and/or database management system 420. In such cases, the service provider system 410 can execute a test and analysis module 440 which can analyze the extracted SQL code using one or more standard or customized tools. A recommendation module 450 of the service provider system can be used to analyze the output of these tools 440 and can provide set of recommendations, for example based on or guided by input from one or more human analysts operating the service provider system 410. The recommendations can be provided to the portal 455 to then be made available to the user of the customer system 405, for example in the form of one or more web pages 460 or other interface. Examples, of such an interface will be described in greater detail below with reference to FIGS. 6 and 7.

Additionally or alternatively, the gateway 430 may replicate some or all of the application data of the database 425 and capture the workload of the customer system 405 at a particular point in time which may be selected or agreed upon by user of the customer system 405 as representative of a peak or other load to be tested. This information can be provided by the gateway 430 to the service provider system 410 in the captured data 435. Once obtained, the service provider system 410 can replay the captured workload with a test system 445 utilizing the replicated application data and while implementing any changes specified by the user of the customer system 405. In other words, the service provider system 410, through the gateway 430 and replay/test module 445, can setup and capture workloads from the customer system 405 and re-execute them with high fidelity on test copies. Generate recommendations and present results and recommendations through customer portal interface. Once again, the recommendation module 450 of the service provider system 410 can be used to analyze the output of these tests and can provide set of recommendations, for example based on or guided by input from one or more human analysts operating the service provider system 410. The recommendations can be provided to the portal 455 to then be made available to the user of the customer system 405, for example in the form of one or more web pages 460 or other interface. Examples, of such an interface will be described in greater detail below with reference to FIGS. 6 and 7.

Results presented in the results and recommendation pages 460 can comprise representations of what operations or functions performed faster, the same, or slower with the specified changes, i.e., relative to performance without those changes. The results and recommendation pages 460 can also comprise a summary of what aspects of the customer system 405 may need attention and may indicate a severity of detected issues, e.g., critical, severe, moderate, etc. As will be described in greater detail below, the results and recommendation pages 460 can be presented in the form of a score card which the user of the customer system 405 can review and decide what issues to address and how to address them. Once any recommendations or other changes are implemented, the load testing process may be repeated upon the request and/or approval of the user of the customer system 405.

Figure 5:
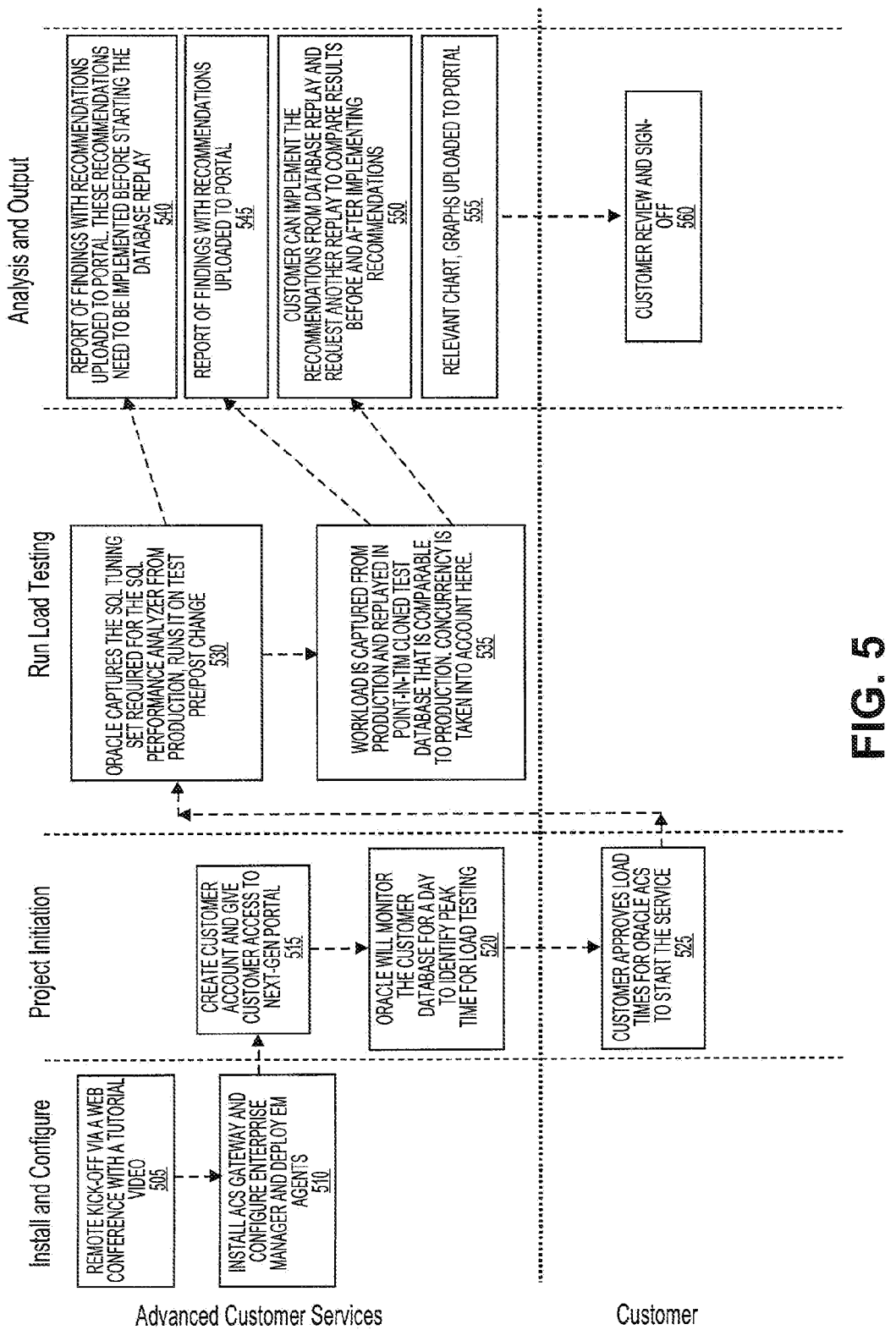
FIG. 5 is a flowchart illustrating a process for performing load testing according to one embodiment of the present invention.

FIG. 5 is a flowchart illustrating a process for performing load testing according to one embodiment of the present invention. As illustrated here, the process can begin with an install and configure phase in which the service provider system can kick-off 505, for example via a web conference or other interaction with the customer, the load testing process. Once initiated, the service provider system can install and configure 510 (with customer approval) the gateway on the customer system. Project initiation can continue with the service provider system creating 515 a customer account and granting the customer access to the portal of the service provider system. Next, the service provider system can monitor 520 the customer system through the gateway for a period of time to identify peak times for load testing. These peak times may be presented to the customer, e.g., though the portal interface, for approval 525 and use in the load testing process.

Once the times have been approved 525, load testing can continue with the service provider system capturing 530 a data set, e.g., an SQL tuning set, for use by test programs or scripts. Additionally, a workload can be captured 535 from the customer system and replayed in a point-in-time clone database of the customer's system.

During an output phase, a variety of different reports and/or other information can be provided by the service provider system. For example, the service provider system may report 540 findings and recommendations based on the captured 530 data and the execution thereon by the test programs. Additionally or alternatively, the service provider system may report 540 findings and recommendations based on the replay 535 of the captured workload on the point-in-time clone of the customer's system. Based on either or both of these reports, the customer may request and the service provider system may provide another replay 550 to compare results of before and after implementing the recommendations. Additionally or alternatively, the service provider system may provide 555 various charts and graphs of the load and replay results through the portal. Any one or more of these and other reports may be provided through the portal for review 560 and approval by the customer.

Stated another way, providing load testing services to one or more remote computer systems can comprise initiating 505-525 by a service provider computer system one or more load testing services. A set of data related to performance of the one or more remote computer systems can be captured 530 and 535 by the service provider system through a gateway. One or more tests can be performed 530 and 535 by the service provider computer system on the captured set of data. A set of one or more reports based on results of performing the one or more tests on the captured data can be provided 540-560 by the service provider computer system through the portal. In some cases, capturing 530 and 535 a set of data related to performance of the one or more remote computer systems and performing 530 and 535 one or more tests on the captured set of data, and providing 540-560 through the portal a set of one or more reports based on results of performing the one or more tests on the captured data can be repeated after adjustments have been made to the one or more remote computer systems.

Figure 6:
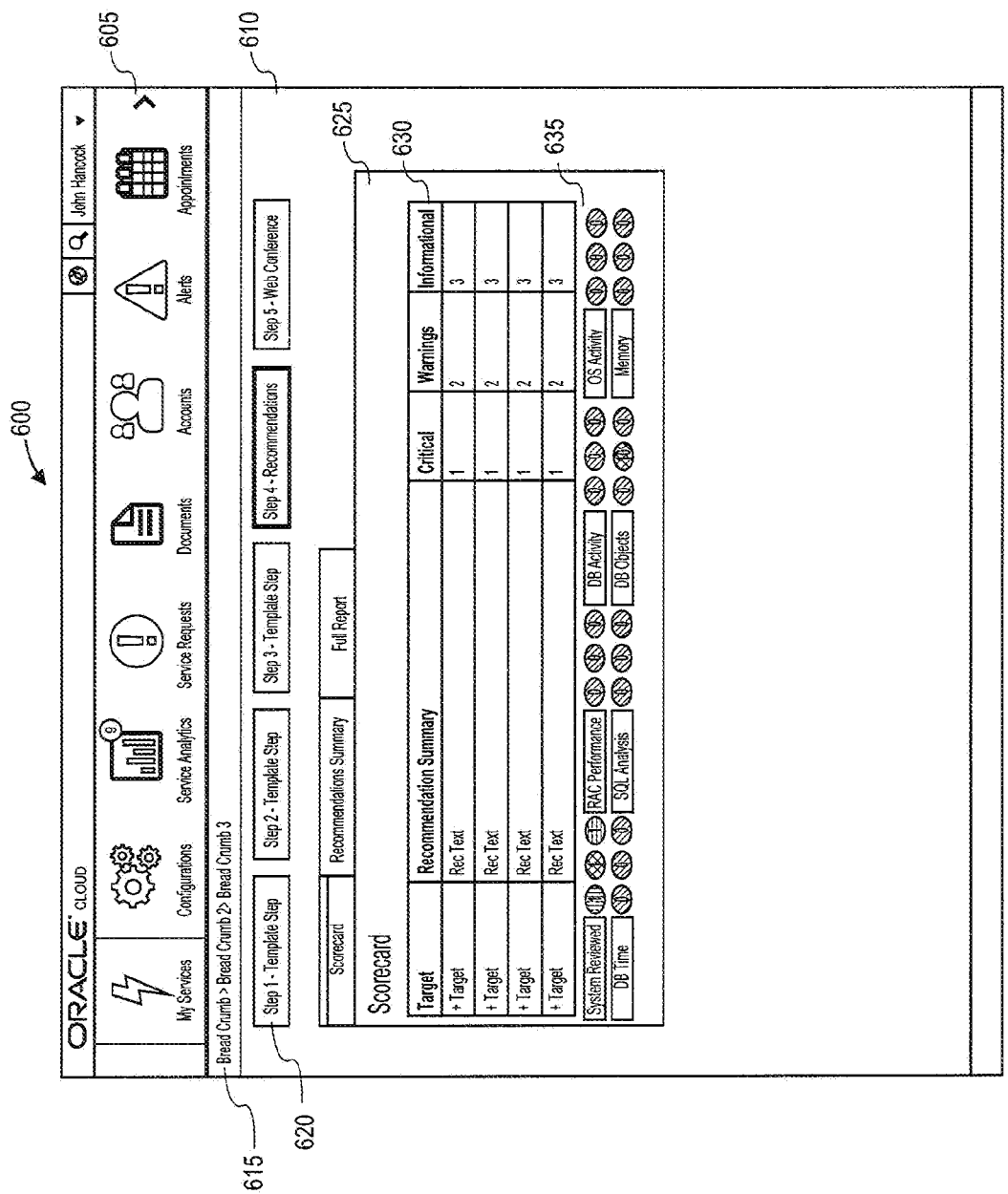
FIG. 6 illustrates an exemplary user interface including a load testing scorecard according to one embodiment of the present invention.

FIG. 6 illustrates an exemplary user interface including a load testing scorecard according to one embodiment of the present invention. This example shows a page 600 that can be presented as part of the portal user interface as described above. This page 600 includes a top level navigation header 605 and a content section 610. The options presented in the navigation header 605 provide the user with a number of options for navigation. The UI of the portal may give the customer access to the functionalities of the portal modules and layers. The navigation header 605 may include option for viewing services in "My Services", configurations in "Configurations", service analytics in "Service Analytics", service requests in "Service Requests", documents in "Documents", account information in "Accounts", alerts in "Alerts", and appointments and scheduled services in "Appointments." Selecting, clicking, touching, and/or the like any of the options of the navigation header 605 may invoke or initiate one or more layers, modules, and the like to provide the user with additional information pertaining to the option selected. In some embodiments, the information displayed in the content section 610 of the page 600 when an option of the navigation header 605 is selected may be generated in real time by the one or more layers and/or modules of the portal. In some embodiments, at least some of the information displayed when an option is selected in the navigation header 605 may be pre-generated by one or more of the layers and/or modules of the portal and stored for display when the option is selected.

In embodiments, selecting the "My Services" option from the navigation header 605 may provide in the content section 605 information related to services that are available or deployed to the gateway for the customer. For example, a service dashboard may be displayed that shows active services, inactive/complete services for example. The content section 610 may typically include a combination of data tables, graphs, text, pictures, maps, and/or the like to display or summarize the information. The content section 610 of the page 600 when the "My Services" option of the navigation header 605 is selected may display data related to specific services. For example, the load testing service described herein can comprise a set of defined steps or discreet sub-processes in the overall workflow. Therefore, the content section 610 can include elements such as a set of breadcrumbs 615 and/or buttons 620 or similar elements to help the user understand the current progress of the process and/or select views of the data related to the current state of the overall process.

As illustrated in this example, the content section 610 of the page 600 can also include a scorecard 625 providing a summary of results for the load testing service. For example, the scorecard 625 can include a table 630 comprising a list of targets or aspects of the customer's system that may require some attention, indications of a severity of each of those issues, and associated recommendations for dealing with each of those issues. Additionally, the score card can include a section 635 comprising a summary of the monitored aspects and results for each.

Figure 7:
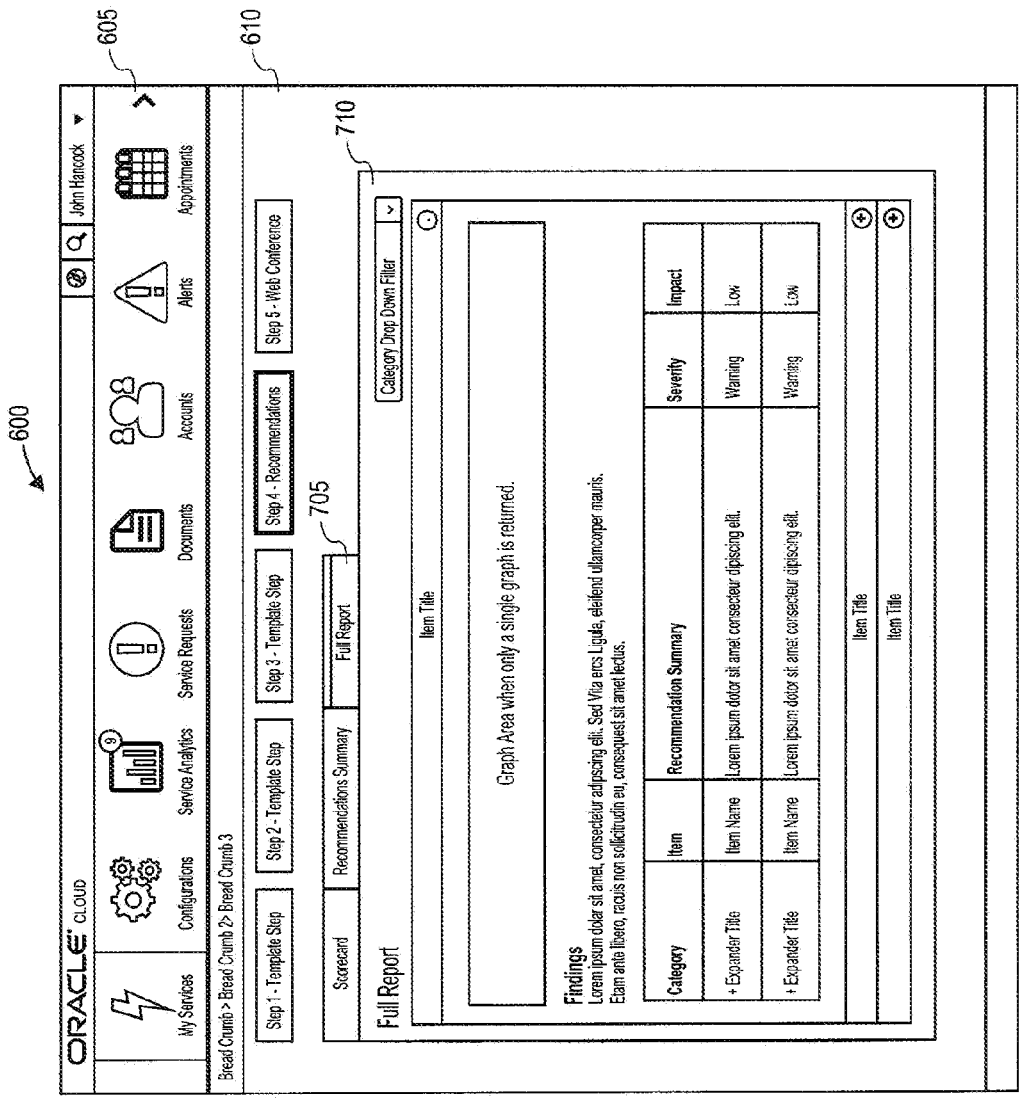
FIG. 7 illustrates additional details of an exemplary user interface including a load testing report according to one embodiment of the present invention.

FIG. 7 illustrates additional details of an exemplary user interface including a load testing report according to one embodiment of the present invention. In this example, the scorecard of the content section 610 of the page 600 has been updated to reveal additional details of the service results. For example, the user may select a tab 705, link, button, or other element of the content section 610 to reveal additional results, recommendations, related content, and/or other information related to the results of the load testing service. In this case, the scorecard has been updated to show a report 710 of the service results.

Figure 8:
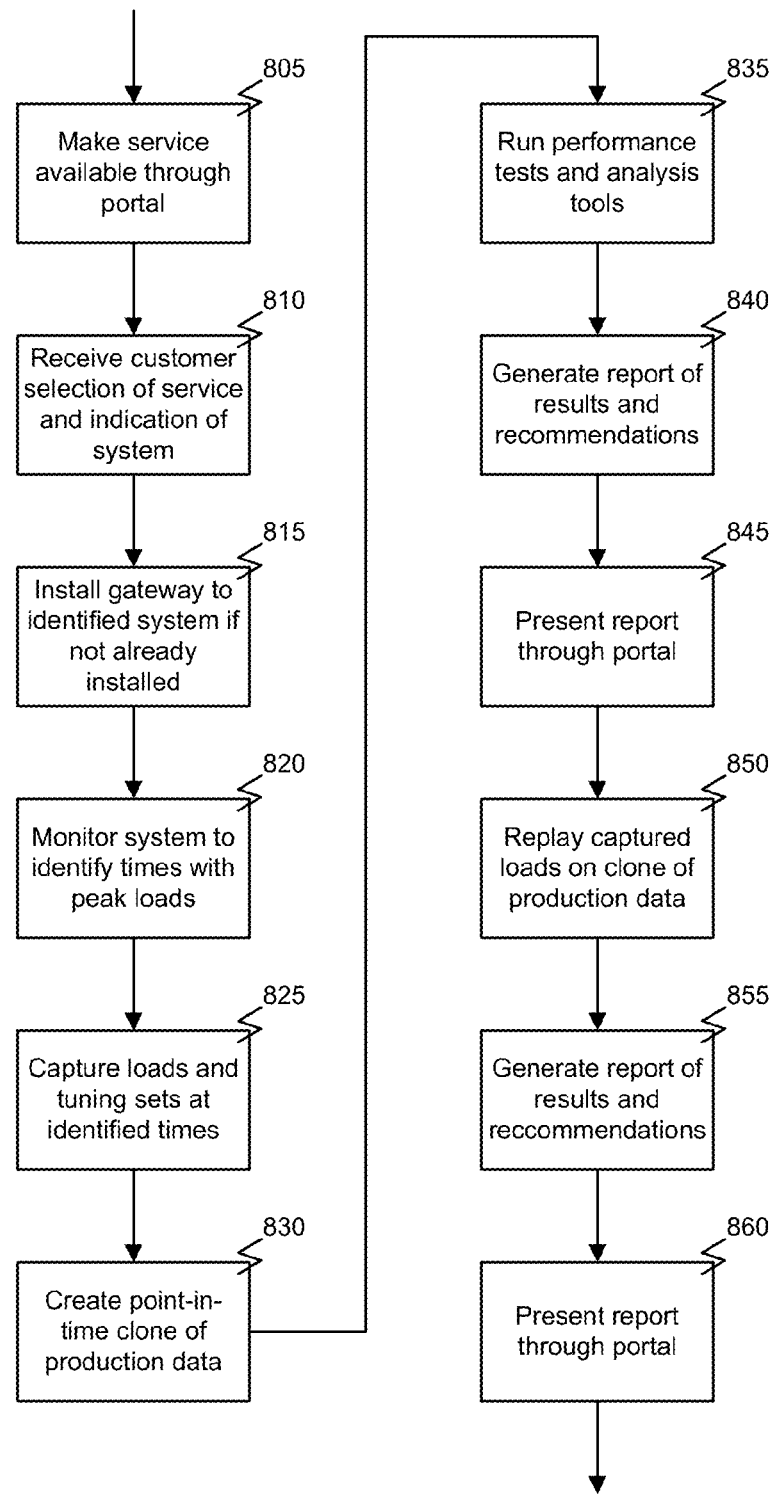
FIG. 8 is a flowchart illustrating additional details of a process for performing load testing according to one embodiment of the present invention.

FIG. 8 is a flowchart illustrating additional details of a process for performing load testing according to one embodiment of the present invention. As illustrated here, providing load testing services to one or more remote computer systems can comprise initiating by a service provider computer system one or more load testing services. Initiating the one or more load testing services can comprise providing 805 access to the one or more load testing services through the portal and receiving 810 through the portal a customer selection of at least one of the one or more load testing services and an indication of the one or more remote computer system as targets of the selected at least one of the one or more load testing services. Initiating the services may also include, in some cases, installing 815 the gateway on the one or more remote computer systems indicated as targets if the gateway is not yet installed on those one or more remote computer systems.

A set of data related to performance of the one or more remote computer systems can be captured by the service provider system through a gateway. Capturing the set of data related to performance of the one or more remote computers can comprise monitoring 820 through the gateway the one or more remote computer systems indicated as targets for a period of time to identify periods of peak loads for the one or more remote computer systems indicated as targets within the period of time. In some cases, identifying periods of peak loads for the one or more remote computer systems indicated as targets within the period of time can further comprise providing through the portal an indication of the periods of peak loads for the one or more remote computer systems indicated as targets and receiving through the portal an indication of acceptance of the identified periods of peak loads for the one or more remote computer systems indicated as targets. Workloads and tuning set data can be captured 825 by the service provider system through the gateway at the identified periods of peak loads. A point-in-time clone of a set of production data of the one or more remote computer systems indicated as targets can also be created 830 by the service provider system.

One or more tests can be performed by the service provider computer system on the captured set of data. In some cases, performing one or more tests on the captured set of data can comprise executing 835 one or more analysis tool on the captured tuning set data. In such cases, providing one or more reports based on results of performing the one or more tests on the captured data can comprise generating 840 a report of results of executing the one or more analysis tools on the captured tuning set data, wherein the report includes one or more recommendations associated with the results, and the report can be presented 845 through the portal. Additionally or alternatively, performing one or more tests on the captured set of data can comprise replaying 850 the captured workloads on the point-in-time clone of the set of production data of the one or more remote computer systems indicated as targets. In such cases, providing one or more reports based on results of performing the one or more tests on the captured data can comprise generating 855 a report of results of replaying the captured workloads on the point-in-time clone of the set of production data of the one or more remote computer systems indicated as targets. The report can also include one or more recommendations associated with the results and can be provided 860 through the portal. In some cases, capturing 820-830 a set of data related to performance of the one or more remote computer systems and performing 835-860 one or more tests on the captured set of data can be repeated after adjustments have been made to the one or more remote computer systems.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for providing load testing services to one or more remote computer systems, the method comprising:
   initiating by a service provider computer system one or more load testing services;
   capturing by the service provider computer system through a gateway a set of data related to performance of the one or more remote computer systems;
   performing by the service provider computer system one or more tests on the captured set of data;
   capturing workloads by the service provider computer system through the gateway;
   creating by the service provider computer system a point-in-time clone of a set of production data of the one or more remote computer systems;
   generating by the service provider computer system one or more recommendations based at least in part on results of replaying the captured workloads on the point-in-time clone; and
   providing by the service provider computer system through a portal a first set of one or more reports based at least in part on results of the performing the one or more tests on the captured set of data;
   wherein the first set of one or more reports comprises a plurality of detected issues along with corresponding indications of severity and the one or more recommendations based at least in part on results of replaying captured workloads on the point-in-time clone.

2. The method of claim 1, wherein initiating the one or more load testing services comprises:
   providing by the service provider computer system access to the one or more load testing services through the portal;
   receiving by the service provider computer system through the portal a customer selection of at least one of the one or more load testing services and an indication of the one or more remote computer systems as targets of the selected at least one of the one or more load testing services; and
   installing by the service provider computer system the gateway on the one or more remote computer systems indicated as targets if the gateway is not yet installed on the one or more remote computer systems indicated as targets.

3. The method of claim 2, wherein capturing the set of data related to performance of the one or more remote computer systems comprises:
   monitoring by the service provider computer system through the gateway the one or more remote computer systems indicated as targets for a period of time to identify periods of peak loads for the one or more remote computer systems indicated as targets within the period of time; and
   capturing by the service provider computer system through the gateway tuning set data at the identified periods of peak loads.

4. The method of claim 3, wherein identifying periods of peak loads for the one or more remote computer systems indicated as targets within the period of time further comprises:
   providing by the service provider computer system through the portal an indication of the periods of peak loads for the one or more remote computer systems indicated as targets; and
   receiving by the service provider computer system through the portal an indication of acceptance of the identified periods of peak loads for the one or more remote computer systems indicated as targets.

5. The method of claim 3, wherein the performing the one or more tests on the captured set of data comprises executing one or more analysis tool on the captured tuning set data.

6. The method of claim 5, wherein the providing the first set of one or more reports based at least in part on results of performing the one or more tests on the captured set of data comprises generating a report of results of executing the one or more analysis tools on the captured tuning set data and wherein the report includes one or more recommendations associated with the results.

7. The method of claim 3, wherein the performing the one or more tests on the captured set of data comprises replaying the captured workloads on the point-in-time clone of the set of production data of the one or more remote computer systems indicated as targets.

8. The method of claim 1, further comprising capturing a second set of data related to performance of the one or more remote computer systems and performing one or more additional tests on the captured second set of data, and providing through the portal a second set of one or more reports based at least in part on results of the performing the one or more additional tests on the captured second set of data after adjustments have been made to the one or more remote computer systems.

9. A system comprising:
   a processor; and
   a memory coupled with and readable by the processor and storing a set of instruction which, when executed by the processor, causes the processor to provide load testing services to one or more remote computer systems by:
   initiating one or more load testing services;
   capturing through a gateway a set of data related to performance of the one or more remote computer systems;
   performing one or more tests on the captured set of data;
   capturing workloads through the gateway;
   creating a point-in-time clone of a set of production data of the one or more remote computer systems;
   generating one or more recommendations based at least in part on results of replaying the captured workloads on the point-in-time clone; and providing through a portal a first set of one or more reports based at least in part on results of the performing the one or more tests on the captured set of data;

wherein the first set of one or more reports comprises a plurality of detected issues along with corresponding indications of severity.

10. The system of claim 9, wherein initiating the one or more load testing services comprises:

providing access to the one or more load testing services through the portal;

receiving through the portal a customer selection of at least one of the one or more load testing services and an indication of the one or more remote computer system as targets of the selected at least one of the one or more load testing services; and installing the gateway on the one or more remote computer systems indicated as targets if the gateway is not yet installed on the one or more remote computer systems indicated as targets.

11. The system of claim 10, wherein capturing the set of data related to performance of the one or more remote computer systems comprises:

monitoring through the gateway the one or more remote computer systems indicated as targets for a period of time to identify periods of peak loads for the one or more remote computer systems indicated as targets within the period of time; and capturing through the gateway tuning set data at the identified periods of peak loads.

12. The system of claim 11, wherein identifying periods of peak loads for the one or more remote computer systems indicated as targets within the period of time further comprises:

providing through the portal an indication of the periods of peak loads for the one or more remote computer systems indicated as targets; and receiving through the portal an indication of acceptance of the identified periods of peak loads for the one or more remote computer systems indicated as targets.

13. The system of claim 9, further comprising capturing a second set of data related to performance of the one or more remote computer systems and performing one or more additional tests on the captured second set of data, and providing through the portal a second set of one or more reports based at least in part on results of the performing the one or more additional tests on the captured second set of data after adjustments have been made to the one or more remote computer systems.

14. A computer-readable memory comprising a set of instruction which, when executed by a processor, causes the processor to provide load testing services to one or more remote computer systems by:

initiating one or more load testing services;

capturing through a gateway a set of data related to performance of the one or more remote computer systems;

performing one or more tests on the captured set of data;

capturing workloads through the gateway;

creating a point-in-time clone of a set of production data of the one or more remote computer systems;

generating one or more recommendations based at least in part on results of replaying the captured workloads on the point-in-time clone; and providing through a portal a first set of one or more reports based at least in part on results of the performing the one or more tests on the captured set of data;

wherein the first set of one or more reports comprises a plurality of detected issues along with corresponding indications of severity.

15. The computer-readable memory of claim 14, wherein initiating the one or more load testing services comprises:

providing access to the one or more load testing services through the portal;

receiving through the portal a customer selection of at least one of the one or more load testing services and an indication of the one or more remote computer system as targets of the selected at least one of the one or more load testing services; and installing the gateway on the one or more remote computer systems indicated as targets if the gateway is not yet installed on the one or more remote computer systems indicated as targets.

16. The computer-readable memory of claim 15, wherein capturing the set of data related to performance of the one or more remote computer systems comprises:

monitoring through the gateway the one or more remote computer systems indicated as targets for a period of time to identify periods of peak loads for the one or more remote computer systems indicated as targets within the period of time; and capturing through the gateway tuning set data at the identified periods of peak loads.

17. The computer-readable memory of claim 16, wherein identifying periods of peak loads for the one or more remote computer systems indicated as targets within the period of time further comprises:

providing through the portal an indication of the periods of peak loads for the one or more remote computer systems indicated as targets; and receiving through the portal an indication of acceptance of the identified periods of peak loads for the one or more remote computer systems indicated as targets.

* * * * *

UNITED STATES PATENT AND TRADEMARK OFFICE
CERTIFICATE OF CORRECTION

PATENT NO. : 9,491,072 B2
APPLICATION NO. : 13/937344
DATED : November 8, 2016
INVENTOR(S) : Raghunathan et al.

It is certified that error appears in the above-identified patent and that said Letters Patent is hereby corrected as shown below:

On the Title Page

On page 2, Column 2, item (56), under Other Publications, Line 7, delete "Serverity" and insert -- Severity --, therefor.

In the Drawings

On sheet 3 of 8, in FIG. 3, under Reference Numeral 326, Line 2, delete "Ifrastructure" and insert -- Infrastructure --, therefor.

On sheet 8 of 8, in FIG. 8, under Reference Numeral 855, Line 3, delete "reccommendations" and insert -- recommendations --, therefor.

In the Specification

In Column 1, Line 36, after "MANAGEMENT;"" insert -- and --.

In Column 1, Line 38, after "2013" insert -- , --.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*